(12) United States Patent
Chen

(10) Patent No.: US 6,297,972 B1
(45) Date of Patent: Oct. 2, 2001

(54) BACKUP POWER STAGE ASSOCIATED WITH A DUAL INPUT POWER SUPPLY AND METHOD OF OPERATING THE SAME

(76) Inventor: Qing Chen, 1528 Sussex Dr., Plano, TX (US) 75075

(*) Notice: Subject to any disclaimer, the term of this patent is extended or adjusted under 35 U.S.C. 154(b) by 0 days.

(21) Appl. No.: 09/567,881

(22) Filed: May 10, 2000

(51) Int. Cl.[7] ........................................... H02M 5/45
(52) U.S. Cl. ..................... 363/37; 363/24; 363/142; 307/64
(58) Field of Search ............................. 363/14, 34, 35, 363/37, 40, 44, 142, 24; 307/64, 65, 66

(56) References Cited

U.S. PATENT DOCUMENTS

| | | | |
|---|---|---|---|
| 4,709,318 | * 11/1987 | Gephart et al. ....................... 363/37 |
| 5,289,046 | * 2/1994 | Gregorich et al. ..................... 307/66 |
| 5,633,539 | * 5/1997 | Tassitino, Jr. ........................ 307/64 |
| 5,910,689 | * 6/1999 | Ertz, III et al. ...................... 307/64 |
| 5,982,645 | * 11/1999 | Levran et al. ........................ 363/37 |
| 5,982,652 | * 11/1999 | Simonelli et al. .................... 363/142 |
| 5,994,794 | * 11/1999 | Wehrlen ............................... 307/66 |
| 6,069,412 | * 5/2000 | Raddi et al. .......................... 307/66 |

* cited by examiner

Primary Examiner—Adolf Deneke Berhane

(57) ABSTRACT

A dual input power supply, a method of operating the power supply and a telecommunications power plant incorporating the power supply or the method. In one embodiment, the power supply includes: (1) a single stage power converter, coupled to an input of the power supply, configured to receive primary power subject to interruption and provide therefrom DC power to a DC bus; (2) an output power stage, coupled to the DC bus, configured to condition the DC power for delivery to an output of the power supply; and (3) a backup power stage, couplable to a backup power source and having an output coupled to the DC bus, configured to provide backup power during the interruption, the single stage power converter configured to restrict a reverse flow of the backup power therethrough during the interruption.

18 Claims, 2 Drawing Sheets

BACKUP POWER STAGE ASSOCIATED WITH A DUAL INPUT POWER SUPPLY AND METHOD OF OPERATING THE SAME

CROSS-REFERENCE TO RELATED PATENT

This application is related to U.S. patent application Ser. No. 09/568,396 entitled "Fault-tolerant Dual-input Power Supply and Method of Operation Thereof" by Chen, et al., filed on May 10, 2000. The above-listed application is incorporated herein by reference as if reproduced herein in its entirety.

TECHNICAL FIELD OF THE INVENTION

The present invention is directed, in general, to power conversion and, more specifically, to a dual input power supply, a method of operating the power supply and a telecommunications power plant incorporating the power supply or the method.

BACKGROUND OF THE INVENTION

The reliability of telecommunication systems that users have come to expect and depend on is based, in part, on the systems' reliance on redundant equipment and power supplies. Telecommunication switching systems, for example, route tens of thousands of calls per second. The failure of such systems, due to, for instance, the loss of incoming AC power, may result in a loss of millions of telephone calls and a corresponding loss of revenue.

Power plants, such as battery plants, attempt to alleviate the power loss problem by providing the telecommunication system with a backup power supply for use in the event that the incoming AC power is interrupted. Since the backup power supply is often called upon to provide power to the load for durations longer than just a few seconds, the implementation of a battery backup system has a significant impact on both the performance and the cost of the power plant.

A concern with respect to battery plants is managing the transition from a normal or primary mode of operation to a backup mode of operation requiring the use of a backup power system. A control circuit used to manage such a transition is required to detect when there is an absence of primary power to a primary power system and switch to the backup power system. Typically, the primary power system and the backup power system are voltage sources having a low output impedance. Since the outputs of the low output impedance voltage sources cannot generally be directly coupled together without causing serious circulating current problems (resulting in probable component damage), the transition must be orchestrated carefully. This requirement typically increases the complexity and therefore the cost of such control circuits.

Another perhaps more strategic concern is the ability of the power system to continue to operate when a component or collection of components experience a fault. Present fault-tolerant structures often depend on a multiplicity of completely redundant circuits or systems wherein one or more of such circuits or systems may be completely removed from the system if they become faulted. This approach, of course, increases the overall cost proportionally and may raise the overall reliability only marginally depending on a particular configuration.

Accordingly, what is needed in the art is a dual input power supply and a method of operating the power supply that overcomes the deficiencies of the prior art.

SUMMARY OF THE INVENTION

To address the above-discussed deficiencies of the prior art, the present invention provides a dual input power supply, a method of operating the power supply and a telecommunications power plant incorporating the power convertor or the method. In one embodiment, the power supply includes: (1) a single stage power converter, coupled to an input of the power supply, configured to receive primary power subject to interruption and provide therefrom DC power to a DC bus; (2) an output power stage, coupled to the DC bus, configured to condition the DC power for delivery to an output of the power supply; and (3) a backup power stage, couplable to a backup power source and having an output coupled to the DC bus, configured to provide backup power during the interruption, the single stage power converter configured to restrict a reverse flow of the backup power therethrough during the interruption.

The present invention introduces, in one aspect, a power supply architecture that is capable of isolating the single stage power converter from the rest of the power supply in the event that primary power to the single stage power converter is interrupted. The single stage power converter is also isolated from the rest of the power supply in the event of a fault in the single stage power converter. The power supply allows substantially the full capacity of the backup power source to be delivered to the output of the power supply without having a substantial portion of the backup power being diverted to the single stage power converter. The conversion from primary power to backup power is provided seamlessly, without having to connect the backup power stage or disconnect the single stage power converter to the output power stage of the power supply.

In one embodiment of the present invention, the primary power is AC power. In this embodiment, the power supply further includes an input filter coupled to the input of the power supply. The power supply further includes a rectifier coupled to the input filter. The input filter filters the AC power to develop filtered AC power and prevents noise generated by the power supply from being injected into the AC line. The rectifier rectifies the filtered AC power to provide rectified power for delivery to the single stage power converter. In a related embodiment, the single stage power converter is configured to provide power factor correction, isolation and voltage regulation of the primary power.

In one embodiment of the present invention, the output power stage includes a DC-AC converter. In an alternative embodiment, the output power stage includes a DC-DC converter. In a related embodiment, the output power stage further includes an output filter coupled to the output of the power supply. The output filter smooths and filters the output voltage. A wide variety of output filter topologies may be employed as required.

In one embodiment of the present invention, the backup power stage includes a bi-directional DC-DC converter. The DC-DC converter may transfer power from the DC bus to the backup power source to charge the backup power source. Alternatively, the DC-DC converter may transfer power from the backup power source to the DC bus to allow the output power stage to provide power to a load coupled thereto.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
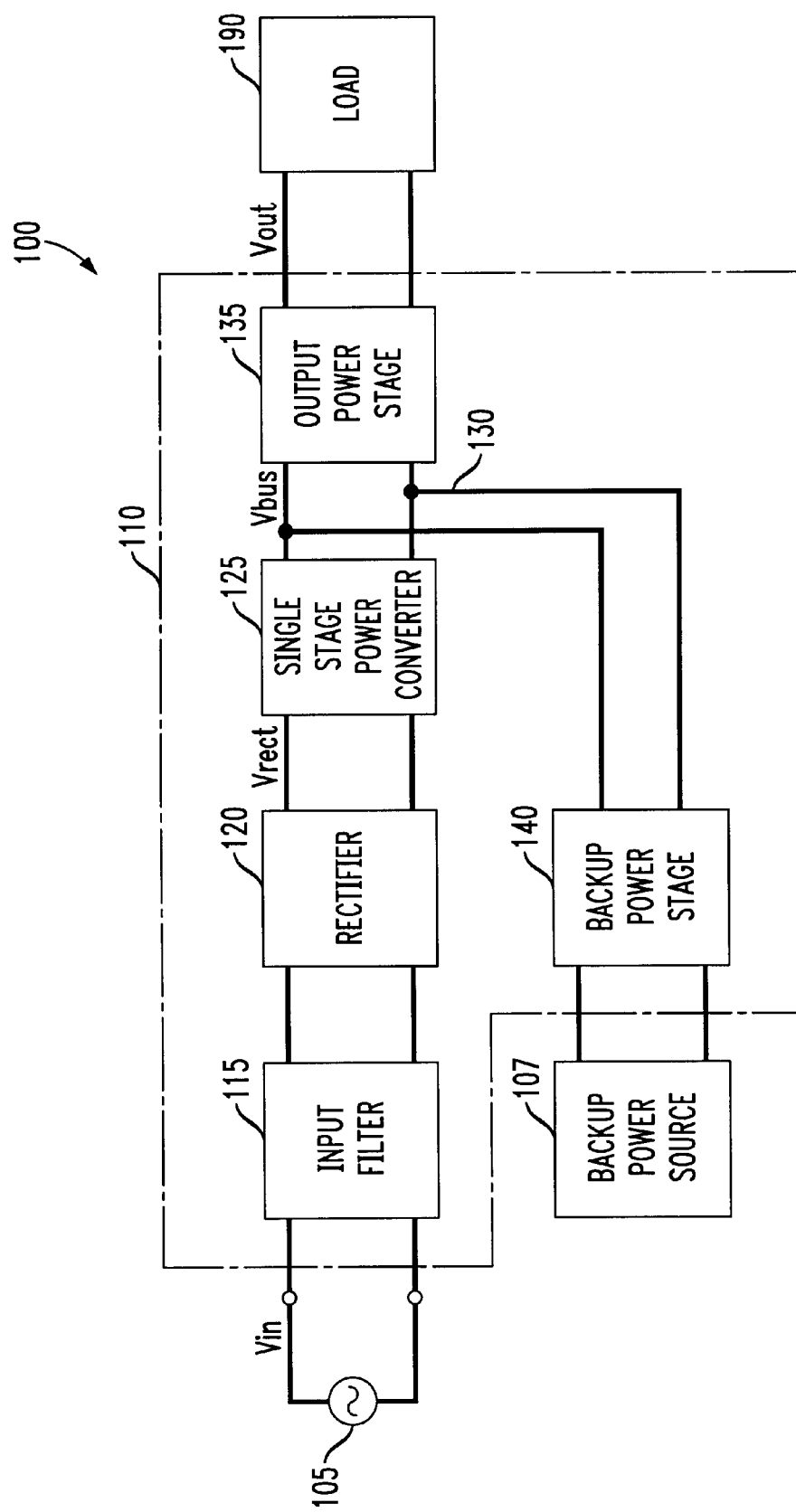
FIG. 1 illustrates a functional block diagram of an embodiment of a telecommunications power plant constructed according to the principles of the present invention.

Referring initially to FIG. 1, illustrated is a functional block diagram of an embodiment of a telecommunications power plant 100 constructed according to the principles of the present invention. The telecommunications power plant 100 includes a dual input power supply 110 having an input couplable to a source of primary power 105 (with an input voltage Vin). Since the primary power may be subject to interruption, the power supply 110 is also couplable to a source of backup power (backup power source) 107. The source of backup power 107 may, in a preferred embodiment, be a battery. The power supply 110 provides output power (having an output voltage Vout) to telecommunications equipment 190 coupled to an output of the power supply 110.

In the illustrated embodiment, the primary power is AC power. The power supply 110 includes an input filter 115 and a rectifier 120 coupled to the input of the power supply 110. The input filter 115 filters the AC power to develop filtered AC power while the rectifier 120 rectifies the filtered AC power to develop rectified power.

The power supply 110 further includes a single stage power converter 125 coupled to the rectifier 120. The single stage power converter 125 receives the rectified power from the rectifier 120 and provides DC power (having a voltage Vbus) to a DC bus 130. The single stage power converter 125 is advantageously capable of providing power factor correction, isolation and voltage regulation in a single stage.

The power supply 110 further includes an output power stage 135 coupled to the DC bus 130. The output power stage 135 receives the DC power from the DC bus 130 and conditions the DC power into AC or DC power for delivery to the output of the power supply 110.

The power supply 110 further includes a backup power stage 140 couplable to the source of backup power 107. The backup power stage 140 is coupled to the DC bus 130 and is configured to provide power to the DC bus in the event of an interruption in the primary power available from the source of primary power 105.

During a normal mode of operation, the telecommunications power plant 100 receives primary power from the source of primary power 105. The primary power is processed by the single stage power converter 125 and the output power stage 135 to provide the DC output voltage Vout to the telecommunications equipment 190. Additionally, during the normal mode of operation, the backup power stage 140 receives power from the DC bus 130 to maintain a required power capacity of the source of backup power 107. Circumstances may arise, however, when the primary power may be subject to interruption, leading to the use of a backup mode of operation.

During the backup mode of operation, the single stage power converter 125 is unable to provide power to DC bus 130 and therefore, telecommunications equipment 190. This condition may exist due to an absence of primary power (from the source of primary power 105) or because the single stage power converter 125 is not operational. The single stage power converter 135 may become faulted due to, perhaps, a failure of one or more of its constituent components.

In either case, the backup power stage 140 receives power from the source of backup power 107 and provides backup power to the output power stage 135 (via the DC bus 130). This allows continued operation of the telecommunications equipment 190 during the interruption. During the backup mode of operation, the single stage power converter operates to restrict a reverse flow of the backup power therethrough.

Figure 2:
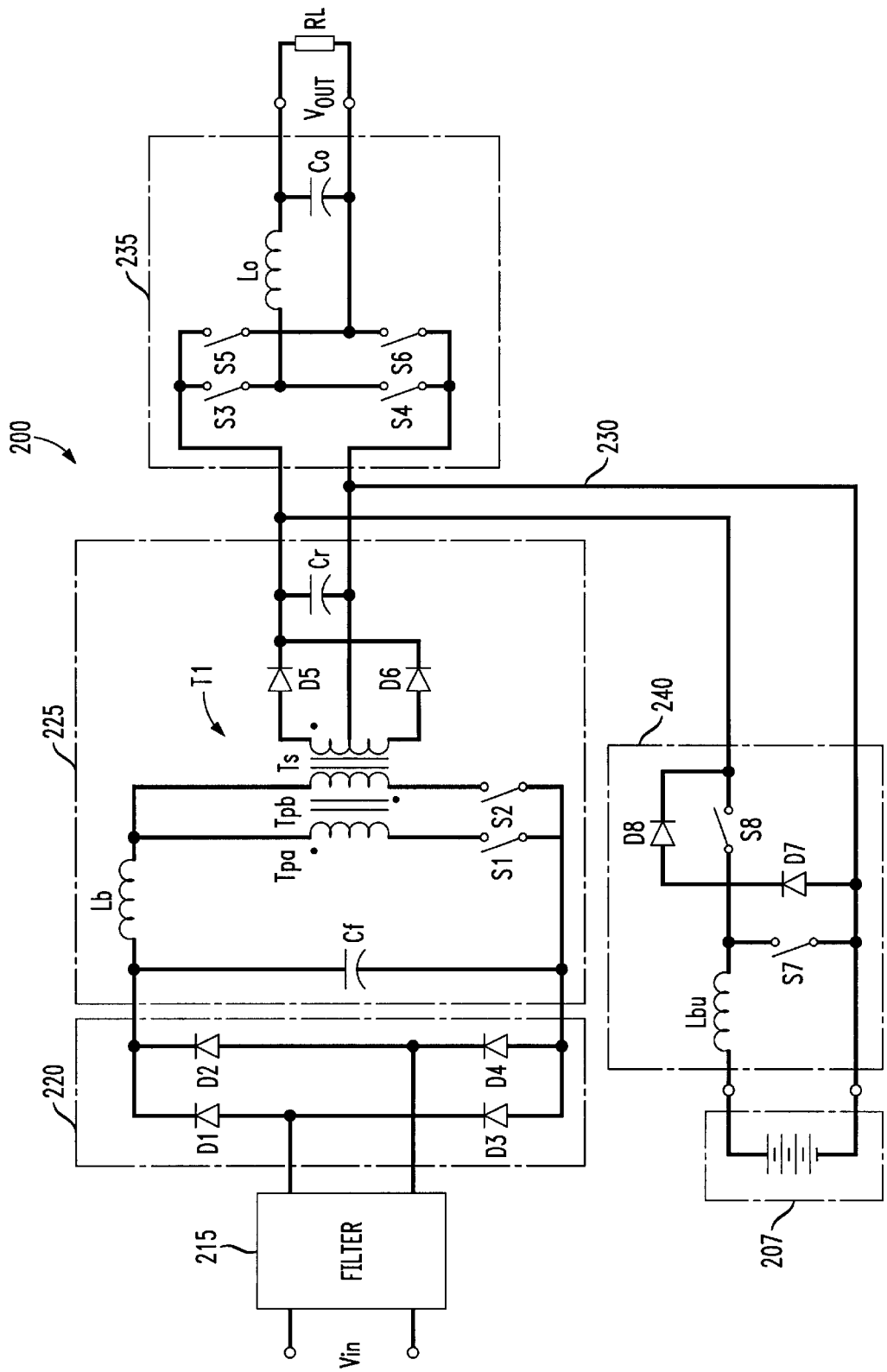
FIG. 2 illustrates a schematic diagram of an embodiment of a dual input power supply constructed according to the principles of the present invention.

Turning now to FIG. 2, illustrated is a schematic diagram of an embodiment of a dual input power supply 200 constructed according to the principles of the present invention. The power supply 200 has a first input couplable to a source of primary power (not shown) having an input voltage Vin. The power supply 200 has a second input couplable to a source of backup power (backup power source) 207, which is a battery in the illustrated embodiment. The power supply 200 provides output power to a load $R_L$ coupled to an output of the power supply 200. In the illustrated embodiment, the power supply 200 provides AC output power to the load $R_L$. In other advantageous embodiments, the power supply 200 may provide DC output power to the load $R_L$.

The power supply 200 includes an input filter 215 that reduces electromagnetic interference (EMI) associated with the source of primary power. The power supply 200 further includes rectifier 220 coupled to the input filter 215. In the illustrated embodiment, the rectifier 220 is a full bridge rectifier having first, second, third and fourth diodes D1, D2, D3, D4.

The power supply 200 further includes a single stage power converter 225 coupled to the rectifier 220. The single stage power converter 225 receives rectified power from the rectifier 220 and provides DC power to a DC bus 230. In the illustrated embodiment, the single stage power converter 225 includes a filter capacitor Cf, a boost inductor Lb and first and second power switches S1, S2 that are respectively coupled to the first and second primary windings Tpa, Tpb of an isolation transformer T1. The single stage power converter 225 further includes fifth and sixth diodes D5, D6 coupled to a secondary winding Ts of the isolation transformer T1. The single stage power converter 225 still further includes a capacitor Cr coupled to the fifth and sixth diodes D5, D6. The single stage power converter 225 is advantageously capable of performing power factor correction, isolation and voltage regulation in a single power conversion stage.

The power supply 200 further includes an output power stage 235 coupled to the DC bus 230. In the illustrated embodiment, the output power stage 235 has a full bridge topology and is configured to provide AC output power to the load $R_L$. The output power stage 235 includes third, fourth, fifth and sixth power switches S3, S4, S5, S6. The output power stage 235 further includes a resonant circuit, having an inductor Lo and a capacitor Co.

In an alternative embodiment, the output power stage 235 may be configured to provide DC output power to the load $R_L$. The inductor Lo and the capacitor Co may, in such an embodiment, form an output filter that smooths and filters the DC output power.

The power supply 200 still further includes a backup power stage 240 coupled to the DC bus 230. In the illustrated embodiment, the backup power stage is a bi-directional DC-DC converter having an inductor Lbu, seventh and eighth power switches S7, S8, and seventh and eighth diodes D7, D8. The seventh and eighth diodes D7, D8 may be body diodes of the seventh and eighth power switches S7, S8, respectively or may be external diodes.

The power supply 200 operates as follows. During a normal mode of operation, the power supply 200 receives primary power, which may be AC power, from the source of primary power (not shown). The filter 215 filters the AC power to develop filtered AC power. The rectifier 220 rectifies the filtered AC power to develop rectified power, which is provided to the single stage power converter 225. The single stage power converter 225 converts the rectified power to DC power and provides the DC power to the DC bus 230. The output power stage 235, coupled to the DC bus 230, inverts the DC power to provide a substantially stable output voltage Vout to the load $R_L$. During the normal mode of operation, the backup power stage 240 receives the DC power from the DC bus 230 and operates as a buck stage to charge the source of backup power 207.

The backup mode of operation is in effect when the single stage power converter 225 is unable to provide DC power to the DC bus 230 due to, among other things, the loss of primary power from the source of primary power. During the backup mode of operation, the source of backup power 207 supplies power to the backup power stage 240. The backup power stage 240 now functions as a boost stage to provide DC power to the DC bus 230. The output power stage 235 receives the DC power from the DC bus 230 and inverts the DC power to provide a substantially stable output voltage Vout to the load $R_L$. During the backup mode of operation, the fifth and sixth diodes D5, D6 and the isolation transformer of the single stage power converter 225 cooperate to restrict a reverse flow of backup power therethrough, allowing substantially the full capacity of the source of backup power 207 to be delivered to the output of the power supply 200 without having a substantial portion of the backup power being diverted to the single stage power converter 225. The conversion from primary power to backup power is provided seamlessly, without having to connect the backup power stage 240 or disconnect the single stage power converter 225 to the output power stage 235 of the power supply 200.

Although the present invention has been described in detail, those skilled in the art should understand that they can make various changes, substitutions and alterations herein without departing from the spirit and scope of the invention in its broadest form.

What is claimed is:

1. A dual input power supply, comprising:
   a single stage power converter, coupled to an input of said power supply, configured to receive primary power subject to interruption and provide therefrom DC power to a DC bus;
   an output power stage, coupled to said DC bus, configured to condition said DC power for delivery to an output of said power supply; and
   a backup power stage comprising a bi-directional DC-DC converter couplable to a backup power source and having an output coupled to said DC bus, configured to provide backup power during said interruption, said single stage power converter configured to restrict a reverse flow of said backup power therethrough during said interruption.

2. The power supply as recited in claim 1 wherein said primary power is AC power, said power supply further comprising:
   an input filter, coupled to said input of said power supply, configured to filter said AC power; and
   a rectifier, coupled to said input filter, configured to provide rectified power to said single stage power converter.

3. The power supply as recited in claim 1 wherein said primary power is AC power, said single stage power converter configured to provide power factor correction, isolation and voltage regulation of said primary power.

4. The power supply as recited in claim 1 wherein said output power stage comprises a DC-AC converter.

5. The power supply as recited in claim 1 wherein said output power stage comprises a DC-DC converter.

6. The power supply as recited in claim 5 wherein said output power stage further comprises an output filter coupled to said output of said power supply.

7. A method of operating a dual input power supply to provide primary and backup power, comprising:
   receiving primary power subject to interruption in a single stage power converter and providing therefrom DC power to a DC bus;
   conditioning said DC power in an output power stage coupled to said DC bus to develop output power for delivery to an output of said power supply;
   providing backup power during said interruption with a backup power stage comprising a bi-directional DC-DC converter couplable to a backup power source and having an output coupled to said DC bus; and
   restricting a reverse flow of said backup power through said single stage power converter during said interruption.

8. The method as recited in claim 7 wherein said primary power is AC power, said method further comprising:
   filtering said AC power to develop filtered AC power; and
   rectifying said filtered AC power for delivery to said single stage power converter.

9. The method as recited in claim 7 wherein said primary power is AC power, said single stage power converter configured to provide power factor correction, isolation and voltage regulation of said primary power.

10. The method as recited in claim 7, wherein said conditioning is performed by a DC-AC converter.

11. The method as recited in claim 7 wherein said conditioning is performed by a DC-DC converter.

12. The method as recited in claim 7 wherein said conditioning comprises filtering said output power with an output filter.

13. A telecommunications power plant, comprising:
   a backup power source;
   a dual input power supply having an input and an output, including:
   a single stage power converter, coupled to said input that receives primary power subject to interruption and provides therefrom DC power to a DC bus,
   an output power stage, coupled to said DC bus, that conditions said DC power for delivery to said output of said power supply, and a backup power stage comprising a bi-directional DC-DC converter, coupled to said backup power source and having an output coupled to said DC bus, that provides backup power during said interruption, said single stage power converter restricting a reverse flow of said backup power therethrough during said interruption; and telecommunications equipment coupled to said output of said power supply.

14. The power plant as recited in claim 13 wherein said primary power is AC power, said power supply further comprising:

an input filter, coupled to said input, that filters said AC power; and a rectifier, coupled to said input filter, that provided rectified power to said single stage power converter.

15. The power plant as recited in claim 13 wherein said primary power is AC power, said single stage power converter providing power factor correction, isolation and voltage regulation of said primary power.

16. The power plant as recited in claim 13 wherein said output power stage comprises a DC-AC converter.

17. The power plant as recited in claim 13 wherein said output power stage comprises a DC-DC converter.

18. The power plant as recited in claim 17 wherein said output power stage further comprises a n output filter coupled to said output of said power supply.

* * * * *